US012234052B2

(12) United States Patent
Hanan et al.

(10) Patent No.: US 12,234,052 B2
(45) Date of Patent: Feb. 25, 2025

(54) CONTAINER PREFORM WITH TAMPER EVIDENCE FINISH PORTION

(71) Applicant: NIAGARA BOTTLING, LLC, Diamond Bar, CA (US)

(72) Inventors: Jay Clarke Hanan, Glendora, CA (US); Ahmed Tasnub Takaddus, Riverside, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 20 days.

(21) Appl. No.: 18/168,478

(22) Filed: Feb. 13, 2023

(65) Prior Publication Data
US 2023/0192344 A1    Jun. 22, 2023

Related U.S. Application Data

(63) Continuation of application No. 16/894,726, filed on Jun. 5, 2020, now Pat. No. 11,597,556, which is a
(Continued)

(51) Int. Cl.
*B65D 1/02* (2006.01)
*B29B 11/08* (2006.01)
(Continued)

(52) U.S. Cl.
CPC ............ *B65D 1/0246* (2013.01); *B29B 11/08* (2013.01); *B29B 11/14* (2013.01);
(Continued)

(58) Field of Classification Search
CPC ....... B65D 1/0246; B29B 11/08; B29B 11/14; B29C 2949/0731; B29C 2949/0733;
(Continued)

(56) References Cited

U.S. PATENT DOCUMENTS

| | | | |
|---|---|---|---|
| 2,947,432 | A | 8/1960 | Marcel |
| 3,029,963 | A | 4/1962 | Heinz |

(Continued)

FOREIGN PATENT DOCUMENTS

| | | | |
|---|---|---|---|
| CN | 101234688 A | 8/2008 | |
| CN | 102848559 A | 1/2013 | |

(Continued)

OTHER PUBLICATIONS

International Search Report with Written Opinion, PCT Application No. PCT/US2020/012147 dated Apr. 6, 2020.
(Continued)

*Primary Examiner* — Kareen K Thomas
(74) *Attorney, Agent, or Firm* — Michael Best & Friedrich LLP

(57) ABSTRACT

A preform is provided for blow-molding to form a container. The preform includes a finish portion for rotatably engaging a closure to seal contents within an interior of the container. The finish portion comprises a cylindrical body that begins at an opening to the interior and extends to and includes a tamper evidence ledge. A mirror polished sealing surface inside the finish portion cooperates with a plug seal of the closure to seal the container. Threads outside the finish portion engage with similar threads inside the closure. Thread starts of the threads reduce potential damage to the threads during installation of the closure. The thread starts may include a start pitch that is greater than a thread pitch of the threads. A handling valley disposed between the threads and the tamper evidence ledge facilitates air-conveying the container along a manufacturing assembly line.

17 Claims, 3 Drawing Sheets

Related U.S. Application Data continuation-in-part of application No. 16/525,890, filed on Jul. 30, 2019, now abandoned.

(60) Provisional application No. 62/712,115, filed on Jul. 30, 2018.

(51) Int. Cl.
*B29B 11/14* (2006.01)
*B29K 67/00* (2006.01)

(52) U.S. Cl.
CPC ............... *B29C 2949/0731* (2022.05); *B29C 2949/0733* (2022.05); *B29C 2949/0773* (2022.05); *B29C 2949/0777* (2022.05); *B29K 2067/003* (2013.01)

(58) Field of Classification Search
CPC .... B29C 2949/0773; B29C 2949/0777; B29C 2949/0715; B29C 49/071; B29C 2949/0732; B29C 2949/0769; B29C 2949/0771; B29C 2949/0778; B29K 2067/003; B29L 2031/7158
See application file for complete search history.

(56) References Cited

U.S. PATENT DOCUMENTS

| | | | |
|---|---|---|---|
| 3,032,809 A | 5/1962 | Willard | |
| 3,303,249 A | 2/1967 | Strauss | |
| 3,335,889 A | 8/1967 | Brumme | |
| 3,438,578 A | 4/1969 | Peterson et al. | |
| 3,769,394 A | 10/1973 | Latrielle | |
| 3,773,205 A | 11/1973 | Keller et al. | |
| 3,809,365 A | 5/1974 | Loffler | |
| 3,850,328 A | 11/1974 | Guala | |
| 3,850,329 A | 11/1974 | Robinson | |
| 3,901,403 A | 8/1975 | Menke | |
| D252,530 S | 7/1979 | Budish | |
| 4,197,955 A | 4/1980 | Luenser | |
| 4,316,551 A | 2/1982 | Belokin, Jr. | |
| 4,374,878 A | 2/1983 | Jakobsen et al. | |
| 4,436,212 A | 3/1984 | Alejandro Llera | |
| 4,526,279 A | 7/1985 | Weiler et al. | |
| 4,579,241 A | 4/1986 | Hayes | |
| 4,674,643 A | 6/1987 | Wilde et al. | |
| D294,462 S | 3/1988 | Ota et al. | |
| 4,744,478 A | 5/1988 | Hahn | |
| 4,744,479 A | 5/1988 | Schottli | |
| 4,744,480 A | 5/1988 | Luch et al. | |
| 4,756,439 A | 7/1988 | Perock | |
| 4,818,575 A | 4/1989 | Hirata et al. | |
| 4,847,129 A | 7/1989 | Collette et al. | |
| 4,850,850 A | 7/1989 | Takakusaki et al. | |
| 4,863,046 A | 9/1989 | Collette et al. | |
| 4,895,265 A | 1/1990 | Luch et al. | |
| 4,907,709 A | 3/1990 | Abe et al. | |
| 4,927,680 A | 5/1990 | Collette et al. | |
| 4,948,001 A | 8/1990 | Magly | |
| 5,011,648 A | 3/1991 | Garver et al. | |
| D315,869 S | 4/1991 | Collette | |
| 5,008,066 A * | 4/1991 | Mueller | B65D 1/0223 425/525 |
| 5,009,324 A | 4/1991 | Ochs | |
| 5,061,173 A | 10/1991 | Julian et al. | |
| D321,830 S | 11/1991 | York et al. | |
| 5,067,622 A | 11/1991 | Garver et al. | |
| 5,092,475 A | 3/1992 | Krishnakumar et al. | |
| 5,097,974 A | 3/1992 | Rozenberg | |
| 5,103,991 A | 4/1992 | Collins | |
| 5,116,565 A * | 5/1992 | Yoshino | B65D 1/0276 264/537 |
| 5,133,468 A | 7/1992 | Brunson et al. | |
| 5,137,163 A | 8/1992 | Moore | |
| 5,178,289 A | 1/1993 | Krishnakumar et al. | |
| 5,182,122 A | 1/1993 | Uehara et al. | |
| 5,199,588 A | 4/1993 | Hayashi | |
| 5,213,225 A | 5/1993 | King et al. | |
| 5,248,050 A | 9/1993 | Janousch et al. | |
| 5,255,889 A | 10/1993 | Collette et al. | |
| 5,279,433 A | 1/1994 | Krishnakumar et al. | |
| 5,281,387 A | 1/1994 | Collette et al. | |
| D345,693 S | 4/1994 | Edstrom | |
| 5,303,833 A | 4/1994 | Hayashi et al. | |
| 5,303,834 A | 4/1994 | Krishnakumar et al. | |
| 5,314,084 A | 5/1994 | Flota et al. | |
| 5,337,909 A | 8/1994 | Vailliencourt | |
| 5,340,302 A | 8/1994 | Ingram | |
| 5,341,946 A | 8/1994 | Vailliencourt et al. | |
| D352,238 S | 11/1994 | Vailliencourt et al. | |
| D352,245 S | 11/1994 | Krishnakumar et al. | |
| 5,360,126 A | 11/1994 | Snyder et al. | |
| 5,366,774 A * | 11/1994 | Pinto | B29C 49/071 215/44 |
| 5,381,910 A | 1/1995 | Sugiura et al. | |
| 5,407,086 A | 4/1995 | Ota et al. | |
| D358,766 S | 5/1995 | Vailliencourt et al. | |
| 5,411,699 A | 5/1995 | Collette et al. | |
| 5,455,088 A * | 10/1995 | Deemer | B29B 11/08 428/542.8 |
| D364,565 S | 11/1995 | Vailliencourt et al. | |
| D366,416 S | 1/1996 | Semersky | |
| D366,417 S | 1/1996 | Semersky | |
| 5,487,481 A | 1/1996 | Sander et al. | |
| 5,494,174 A | 2/1996 | Rohr et al. | |
| 5,509,552 A | 4/1996 | Eguchi et al. | |
| 5,511,677 A | 4/1996 | Oder | |
| 5,498,152 A | 5/1996 | Uterlander et al. | |
| 5,632,397 A | 5/1997 | Fandeux et al. | |
| 5,645,183 A | 7/1997 | Slat et al. | |
| 5,669,520 A | 9/1997 | Simpson | |
| 5,704,503 A | 1/1998 | Krishnakumar et al. | |
| D391,168 S | 2/1998 | Qqq | |
| D393,802 S | 4/1998 | Collette et al. | |
| 5,740,932 A | 4/1998 | Bettegazzore | |
| 5,743,419 A | 4/1998 | King | |
| 5,749,201 A | 5/1998 | Cochrane | |
| 5,756,172 A * | 5/1998 | Semersky | B29C 49/071 215/10 |
| 5,762,221 A | 6/1998 | Tobias et al. | |
| 5,792,491 A | 8/1998 | Chaure | |
| 5,795,598 A | 8/1998 | Wohlgemuth et al. | |
| D397,614 S | 9/1998 | Krishnakumar et al. | |
| 5,804,016 A | 9/1998 | Schmidt et al. | |
| D402,895 S | 12/1998 | Takahashi et al. | |
| 5,850,681 A | 12/1998 | La Barre | |
| D404,308 S | 1/1999 | Takahashi et al. | |
| 5,888,598 A | 3/1999 | Brewster et al. | |
| D407,649 S | 4/1999 | McCallister et al. | |
| D407,650 S | 4/1999 | Takahashi et al. | |
| D411,453 S | 6/1999 | Piccioli et al. | |
| 5,908,128 A | 6/1999 | Krishnakumar et al. | |
| 5,915,579 A | 6/1999 | Przytulla et al. | |
| D413,519 S | 9/1999 | Eberle et al. | |
| 5,971,184 A | 10/1999 | Krishnakumar et al. | |
| 5,975,321 A | 11/1999 | Luch | |
| 5,988,417 A | 11/1999 | Chena et al. | |
| 6,016,932 A | 1/2000 | Gaydosh et al. | |
| D419,882 S | 2/2000 | Bretz et al. | |
| D420,592 S | 2/2000 | Bretz et al. | |
| 6,036,037 A | 3/2000 | Scheffer et al. | |
| D423,365 S | 4/2000 | Eberle et al. | |
| 6,044,996 A | 4/2000 | Carew et al. | |
| 6,044,997 A | 4/2000 | Oaa | |
| 6,062,409 A | 5/2000 | Eberle | |
| D426,460 S | 6/2000 | Krishnakumar et al. | |
| D427,905 S | 7/2000 | Eberle | |
| 6,089,390 A | 7/2000 | Druitt et al. | |
| 6,092,688 A | 7/2000 | Eberle et al. | |
| D429,647 S | 8/2000 | Warner et al. | |
| D430,493 S | 9/2000 | Weick | |
| 6,112,925 A | 9/2000 | Nahill et al. | |
| 6,113,841 A | 9/2000 | Nielsen | |
| D434,330 S | 11/2000 | Rowe et al. | |

(56) References Cited

U.S. PATENT DOCUMENTS

| | | |
|---|---|---|
| D440,157 S | 4/2001 | Lichtman et al. |
| D440,158 S | 4/2001 | Bretz et al. |
| D440,877 S | 4/2001 | Lichtman et al. |
| D441,294 S | 5/2001 | Lichtman et al. |
| 6,230,912 B1 | 5/2001 | Rashid |
| 6,248,413 B1 | 6/2001 | Barel et al. |
| D445,033 S | 7/2001 | Bretz et al. |
| 6,257,433 B1 | 7/2001 | Ogg et al. |
| 6,260,723 B1 | 7/2001 | Bergholtz |
| D446,126 S | 8/2001 | Bretz et al. |
| D447,411 S | 9/2001 | Lichtman et al. |
| 6,296,131 B2 | 10/2001 | Rashid |
| 6,347,717 B1 | 2/2002 | Eberle |
| D454,500 S | 3/2002 | Bretz et al. |
| 6,382,444 B1 | 5/2002 | Nyman |
| D465,158 S | 11/2002 | Peek et al. |
| D466,021 S | 11/2002 | Thieriunq et al. |
| D466,819 S | 12/2002 | Darr et al. |
| 6,494,333 B2 | 12/2002 | Sasaki et al. |
| D469,358 S | 1/2003 | Bryant et al. |
| D469,359 S | 1/2003 | Bryant et al. |
| D469,695 S | 2/2003 | Brvant et al. |
| D469,696 S | 2/2003 | Brvant et al. |
| D470,773 S | 2/2003 | Darr et al. |
| 6,523,710 B1 | 2/2003 | Hidding et al. |
| D472,470 S | 4/2003 | Bretz et al. |
| 6,554,146 B1 | 4/2003 | DeGroff et al. |
| D476,236 S | 6/2003 | Unqradv et al. |
| 6,585,125 B1 | 7/2003 | Peek |
| D479,690 S | 9/2003 | DeGroff |
| 6,616,001 B2 | 9/2003 | Saito et al. |
| D480,957 S | 10/2003 | Mooney et al. |
| D485,765 S | 1/2004 | Thieriunq et al. |
| 6,682,794 B1 | 1/2004 | Horn et al. |
| 6,722,514 B2 | 4/2004 | Renz |
| 6,739,467 B2 | 5/2004 | Saito et al. |
| D494,475 S | 8/2004 | Thieriunq et al. |
| D497,551 S | 10/2004 | Gamel et al. |
| 6,830,158 B2 | 12/2004 | Yourist |
| 6,841,262 B1 | 1/2005 | Beck et al. |
| D502,108 S | 2/2005 | Gamel et al. |
| D503,625 S | 4/2005 | Nelson et al. |
| D503,885 S | 4/2005 | Bretz et al. |
| D504,063 S | 4/2005 | Bretz et al. |
| D506,675 S | 6/2005 | Bretz et al. |
| D506,676 S | 6/2005 | Bretz et al. |
| D506,677 S | 6/2005 | Bretz et al. |
| D507,491 S | 7/2005 | Bretz et al. |
| D507,609 S | 7/2005 | Bretz et al. |
| D507,749 S | 7/2005 | Bretz et al. |
| D508,857 S | 8/2005 | Bretz et al. |
| 6,932,230 B2 | 8/2005 | Pedmo et al. |
| 6,938,787 B2 | 9/2005 | Shinozaki |
| D510,526 S | 10/2005 | Bretz et al. |
| 7,025,219 B2 | 4/2006 | Heisner et al. |
| 7,032,770 B2 | 4/2006 | Finlav et al. |
| 7,033,656 B2 | 4/2006 | Nahil et al. |
| D525,530 S | 7/2006 | Livingston et al. |
| 7,077,933 B2 | 7/2006 | Otani et al. |
| D527,643 S | 9/2006 | Gottlieb |
| 7,172,087 B1 | 2/2007 | Axe et al. |
| D538,660 S | 3/2007 | Gatewood |
| 7,198,164 B2 | 4/2007 | Yourist et al. |
| D548,106 S | 8/2007 | Martinez et al. |
| 7,258,244 B2 | 8/2007 | Unqradv |
| D551,081 S | 9/2007 | Ohara et al. |
| 7,267,242 B2 | 9/2007 | Tanaka et al. |
| D555,499 S | 11/2007 | Ross |
| 7,334,695 B2 | 2/2008 | Bvsick et al. |
| 7,334,696 B2 | 2/2008 | Tanaka et al. |
| 7,347,339 B2 | 3/2008 | Banqi et al. |
| 7,364,046 B2 | 4/2008 | Joshi et al. |
| 7,416,089 B2 | 8/2008 | Kraft et al. |
| 7,416,090 B2 | 8/2008 | Mooney et al. |
| D579,339 S | 10/2008 | Shmagin |
| 7,451,886 B2 | 11/2008 | Lisch et al. |
| D584,627 S | 1/2009 | Leooitevin |
| 7,510,094 B1 | 3/2009 | Willis et al. |
| D598,779 S | 8/2009 | Leooitevin |
| 7,637,384 B2 | 12/2009 | Price et al. |
| D610,015 S | 2/2010 | Yourist et al. |
| 7,694,842 B2 | 4/2010 | Melrose |
| 7,699,183 B2 | 4/2010 | Matsuoka et al. |
| 7,748,551 B2 | 7/2010 | Gatewood et al. |
| 7,748,552 B2 | 7/2010 | Livingston et al. |
| 7,757,874 B2 | 7/2010 | Ross |
| D621,271 S | 8/2010 | Soni |
| 7,770,745 B2 | 8/2010 | Weissmann et al. |
| 7,780,025 B2 | 8/2010 | Simpson, Jr. et al. |
| D623,529 S | 9/2010 | Yourist et al. |
| D624,427 S | 9/2010 | Yourist et al. |
| 7,798,349 B2 | 9/2010 | Maczek et al. |
| 7,819,264 B2 | 10/2010 | Brozell et al. |
| 7,824,166 B2 | 11/2010 | Mie et al. |
| D630,515 S | 1/2011 | Bretz et al. |
| 7,861,876 B2 | 1/2011 | Stowitts |
| 7,927,678 B2 | 4/2011 | Mitadera et al. |
| 7,942,287 B2 | 5/2011 | King |
| 7,980,404 B2 | 7/2011 | Trude et al. |
| 8,020,717 B2 | 9/2011 | Patel |
| 8,047,388 B2 | 11/2011 | Kelley et al. |
| 8,091,720 B2 | 1/2012 | Colloud |
| 8,091,724 B2 | 1/2012 | King |
| 8,141,793 B2 | 3/2012 | Wallis et al. |
| 8,268,216 B2 | 9/2012 | Meador |
| 8,308,002 B2 | 11/2012 | Penny |
| 8,308,007 B2 | 11/2012 | Mast et al. |
| 8,328,033 B2 | 12/2012 | Mast |
| 8,328,038 B2 | 12/2012 | Major |
| 8,381,496 B2 | 2/2013 | Trude et al. |
| 8,528,759 B2 | 9/2013 | Pucci |
| 8,544,663 B2 | 10/2013 | Barel et al. |
| 8,544,666 B2 | 10/2013 | Velmer et al. |
| 8,663,761 B2 | 3/2014 | Kwirandt et al. |
| 8,728,601 B2 | 5/2014 | Hutts et al. |
| 8,794,461 B2 | 8/2014 | Major |
| 8,815,356 B2 | 8/2014 | Huettner |
| 8,827,688 B2 | 9/2014 | Maki et al. |
| 8,851,310 B2 | 10/2014 | Pucci |
| 9,033,168 B2 | 5/2015 | Darr et al. |
| 9,221,596 B2 | 12/2015 | Patel et al. |
| 9,233,771 B2 | 1/2016 | Siegl |
| 9,359,099 B2 | 6/2016 | Zoppas et al. |
| 9,815,604 B2 | 11/2017 | Ekkert |
| 9,878,831 B2 | 1/2018 | Danielsson et al. |
| 9,994,350 B2 | 6/2018 | Labadie et al. |
| 10,118,724 B2 | 11/2018 | Hanan |
| 10,329,043 B2 | 6/2019 | Hanan |
| 10,377,534 B2 | 8/2019 | Hanan |
| 10,569,924 B2 | 2/2020 | Jarman et al. |
| 10,647,465 B2 | 5/2020 | Hanan |
| 10,829,260 B2 | 11/2020 | Hanan |
| 10,919,671 B2 | 2/2021 | Hanan |
| 10,974,859 B2 | 4/2021 | Jarmen et al. |
| 10,987,851 B2 | 4/2021 | Hanan |
| 11,142,364 B2 | 10/2021 | Hanan |
| 11,472,093 B2 | 10/2022 | Hanan et al. |
| 11,633,899 B2 | 4/2023 | Hanan et al. |
| 11,738,902 B2 | 8/2023 | Hanan |
| 11,806,917 B2 | 11/2023 | Hanan et al. |
| 2001/0000602 A1 | 5/2001 | Luch |
| 2001/0030166 A1 | 10/2001 | Ozawa et al. |
| 2002/0030031 A1 | 3/2002 | Druitt et al. |
| 2002/0037338 A1* | 3/2002 | Lisch ............ B29C 49/4205 425/525 |
| 2002/0090473 A1 | 7/2002 | Lee et al. |
| 2002/0134747 A1 | 9/2002 | Babcock et al. |
| 2003/0077349 A1 | 4/2003 | Derouault et al. |
| 2003/0127418 A1 | 7/2003 | Schweigert et al. |
| 2004/0000533 A1 | 1/2004 | Kamineni et al. |
| 2004/0121038 A1 | 6/2004 | Seki et al. |
| 2005/0048235 A1 | 3/2005 | Dygert |
| 2005/0067365 A1 | 3/2005 | Hanafusa et al. |
| 2005/0175731 A1 | 8/2005 | Chiang |

(56) References Cited

U.S. PATENT DOCUMENTS

| | | |
|---|---|---|
| 2005/0279728 A1 | 12/2005 | Finlay et al. |
| 2006/0021959 A1 | 2/2006 | Falzoni |
| 2006/0065992 A1 | 3/2006 | Hutchinson et al. |
| 2006/0070977 A1 | 4/2006 | Howell et al. |
| 2006/0113274 A1 | 6/2006 | Keller et al. |
| 2006/0118508 A1 | 6/2006 | Kraft et al. |
| 2006/0131257 A1 | 6/2006 | Gatewood et al. |
| 2006/0157439 A1 | 7/2006 | Howell |
| 2006/0169666 A1 | 8/2006 | Nyman et al. |
| 2006/0255235 A1 | 11/2006 | Meyer et al. |
| 2007/0023299 A1 | 2/2007 | Clarkson |
| 2007/0131644 A1 | 6/2007 | Melrose |
| 2007/0210026 A1 | 9/2007 | Darr et al. |
| 2008/0050546 A1 | 2/2008 | Kitano et al. |
| 2008/0053949 A1 | 3/2008 | Farrar et al. |
| 2008/0073382 A1 | 3/2008 | Higgins |
| 2008/0087628 A1 | 4/2008 | Bangi et al. |
| 2008/0116162 A1 | 5/2008 | Penny |
| 2008/0197102 A1 | 8/2008 | Farrar et al. |
| 2008/0257855 A1 | 10/2008 | Patel |
| 2009/0008360 A1 | 1/2009 | Piccioli et al. |
| 2009/0020497 A1 | 1/2009 | Tanaka et al. |
| 2009/0065468 A1 | 3/2009 | Hata et al. |
| 2009/0078668 A1 | 3/2009 | Kraft |
| 2009/0084751 A1 | 4/2009 | Pucci |
| 2009/0159556 A1 | 6/2009 | Patcheak et al. |
| 2009/0166314 A1 | 7/2009 | Matsuoka |
| 2009/0184082 A1 | 7/2009 | Antier et al. |
| 2009/0184127 A1 | 7/2009 | Mooney |
| 2009/0188888 A1 | 7/2009 | Penny |
| 2009/0261058 A1 | 10/2009 | Pritchett, Jr. |
| 2009/0261059 A1 | 10/2009 | Pritchett, Jr. |
| 2009/0266785 A1 | 10/2009 | Sieal |
| 2009/0283492 A1 | 11/2009 | Molinaro et al. |
| 2009/0283495 A1 | 11/2009 | Lane et al. |
| 2009/0321383 A1 | 12/2009 | Lane |
| 2010/0023378 A1 | 1/2010 | Ratnam |
| 2010/0028577 A1 | 2/2010 | Siegl |
| 2010/0089863 A1 | 4/2010 | Matsuoka |
| 2010/0089865 A1 | 4/2010 | Oauchi et al. |
| 2010/0151073 A1 | 6/2010 | Daniel |
| 2010/0163513 A1 | 7/2010 | Pedmo |
| 2010/0176081 A1 | 7/2010 | Kamineni et al. |
| 2010/0178148 A1 | 7/2010 | Forsthoevel et al. |
| 2010/0206837 A1 | 8/2010 | Deemer et al. |
| 2010/0206838 A1 | 8/2010 | Mast et al. |
| 2010/0206839 A1 | 8/2010 | Tanaka et al. |
| 2010/0206892 A1 | 8/2010 | Mast |
| 2010/0213204 A1 | 8/2010 | Melrose |
| 2010/0252583 A1 | 10/2010 | Maas et al. |
| 2010/0270256 A1 | 10/2010 | Penny |
| 2010/0270259 A1 | 10/2010 | Russell et al. |
| 2010/0286837 A1 | 11/2010 | Jiao et al. |
| 2010/0304168 A1 | 12/2010 | Dambach |
| 2010/0304169 A1 | 12/2010 | Dambach |
| 2010/0308054 A1 | 12/2010 | Goria et al. |
| 2010/0314348 A1 | 12/2010 | Zoppas et al. |
| 2010/0320218 A1 | 12/2010 | Tanaka |
| 2011/0008560 A1 | 1/2011 | Dabbous et al. |
| 2011/0017700 A1 | 1/2011 | Patcheak et al. |
| 2011/0024423 A1 | 2/2011 | Erspamaer et al. |
| 2011/0073559 A1 | 3/2011 | Schlies et al. |
| 2011/0115135 A1 | 5/2011 | Siegl |
| 2011/0278313 A1 | 11/2011 | Labadie et al. |
| 2012/0027966 A1 | 2/2012 | Siegl |
| 2012/0031870 A1 | 2/2012 | Porter et al. |
| 2012/0091091 A1 | 4/2012 | Steinberger |
| 2012/0091134 A1 | 4/2012 | Sadiq et al. |
| 2012/0248003 A1 | 10/2012 | Hunter et al. |
| 2012/0263902 A1 | 10/2012 | Hanan |
| 2012/0305516 A1 | 12/2012 | Kuzma et al. |
| 2012/0328804 A1 | 12/2012 | Allen et al. |
| 2013/0113143 A1 | 5/2013 | Favre et al. |
| 2013/0147097 A1 | 6/2013 | Lane et al. |
| 2014/0076838 A1 | 3/2014 | Siegl |
| 2014/0157726 A1 | 6/2014 | Clusserath et al. |
| 2014/0190927 A1 | 7/2014 | Lane |
| 2014/0314984 A1 | 10/2014 | Lehner et al. |
| 2014/0346135 A1 | 11/2014 | Melrose |
| 2015/0027974 A1 | 1/2015 | Niec |
| 2015/0122766 A1 | 5/2015 | Hanan |
| 2015/0144587 A1 | 5/2015 | Hanan |
| 2015/0190975 A1 | 7/2015 | Yokobayashi et al. |
| 2015/0191269 A1 | 7/2015 | Siegl |
| 2015/0202818 A1 | 7/2015 | Marin |
| 2016/0001913 A1 | 1/2016 | Koenig |
| 2016/0137331 A1 | 5/2016 | Hanan |
| 2016/0176566 A1 | 6/2016 | Hanan |
| 2016/0193750 A1 | 7/2016 | Gaiotti et al. |
| 2016/0257029 A1 | 9/2016 | Lane et al. |
| 2017/0210503 A1 | 7/2017 | De Cleir et al. |
| 2017/0217646 A1 | 8/2017 | Hanan |
| 2018/0043603 A1 | 2/2018 | Smith et al. |
| 2018/0044072 A1 | 2/2018 | Asakawa et al. |
| 2018/0133948 A1 | 5/2018 | Suyama et al. |
| 2018/0229881 A1 | 8/2018 | Jarman et al. |
| 2018/0297752 A1 | 10/2018 | Mai |
| 2018/0327131 A1 | 11/2018 | Hanan |
| 2018/0327132 A1 | 11/2018 | Hanan |
| 2018/0339843 A1 | 11/2018 | Cassoni et al. |
| 2019/0263554 A1 | 5/2019 | Hanan |
| 2019/0367203 A1 | 12/2019 | Okuyama et al. |
| 2019/0375556 A1 | 12/2019 | Hanan |
| 2020/0031530 A1 | 1/2020 | Hanan |
| 2020/0031531 A1 | 1/2020 | Hanan |
| 2020/0071035 A1 | 3/2020 | Hanan |
| 2020/0095007 A1 | 3/2020 | Jarman et al. |
| 2020/0198855 A1 | 6/2020 | Sterling et al. |
| 2020/0216213 A1 | 7/2020 | Hanan |
| 2020/0255179 A1 | 8/2020 | Hanan |
| 2020/0269484 A1 | 8/2020 | Hanan |
| 2020/0298461 A1 | 9/2020 | Hanan et al. |
| 2020/0298462 A1 | 9/2020 | Hanan |
| 2022/0041339 A1 | 2/2022 | Hanan |
| 2022/0288834 A1 | 9/2022 | Bruinooge et al. |
| 2022/0097895 A1 | 10/2022 | Hanan |
| 2023/0182949 A1 | 6/2023 | Hanan |
| 2023/0256662 A1 | 8/2023 | Hanan et al. |
| 2024/0075674 A1 | 3/2024 | Hanan et al. |

FOREIGN PATENT DOCUMENTS

| | | |
|---|---|---|
| CN | 106542191 A | 3/2017 |
| DE | 102012001229 A1 | 7/2013 |
| EP | 0199576 A2 | 10/1986 |
| EP | 1405710 B1 | 5/2008 |
| EP | 2687450 A1 | 1/2014 |
| FR | 2846946 B1 | 3/2005 |
| FR | 2899204 B1 | 6/2008 |
| JP | S5486560 A | 7/1979 |
| JP | S6251423 A | 3/1987 |
| JP | H072263 A | 1/1995 |
| JP | H07149357 A | 6/1995 |
| JP | H07164436 A | 6/1995 |
| JP | H0848321 A | 2/1996 |
| JP | H09240647 A | 9/1997 |
| JP | H1029614 A | 2/1998 |
| JP | 2004090425 A | 3/2004 |
| JP | 2006232392 A | 9/2006 |
| JP | 2008189721 A | 8/2008 |
| JP | 2009045877 A | 3/2009 |
| JP | 2010285162 A | 12/2010 |
| JP | 2015182789 A | 10/2015 |
| WO | 199728057 A1 | 8/1997 |
| WO | WO2004080828 A1 | 9/2004 |
| WO | WO2005073096 A1 | 11/2005 |
| WO | WO2006005413 A1 | 1/2006 |
| WO | WO2006027092 A1 | 3/2006 |
| WO | WO2007033722 A1 | 3/2007 |
| WO | WO2007124894 A1 | 11/2007 |
| WO | WO2009122144 A1 | 10/2009 |
| WO | WO2010113079 A2 | 10/2010 |
| WO | WO2011160748 A1 | 12/2011 |
| WO | WO2012095285 A1 | 7/2012 |

(56) References Cited

FOREIGN PATENT DOCUMENTS

| WO | WO2012156048 A1 | 11/2012 |
|----|-----------------|---------|
| WO | WO2015032897 A1 | 3/2015 |
| WO | WO2015189436 A1 | 12/2015 |
| WO | WO2016103563 A1 | 6/2016 |
| WO | WO2017136584 A1 | 8/2017 |
| WO | WO2017183952 A1 | 10/2017 |
| WO | 2020245250 A1 | 12/2020 |
| WO | 2021005505 A1 | 1/2021 |

OTHER PUBLICATIONS

International Search Report with Written Opinion for related Application No. PCT/US2021/035483 dated Sep. 1, 2021 (19 Pages).
European Patent Office Extended Search Report for Related Application No. 20763607.7 dated Oct. 5, 2022 (5 pages).
European Patent Office Extended Search Report for Related Application No. 20774670.2 dated Oct. 21, 2022 (11 pages).
Australian Patent Office. Examination Report No. 1 for Application No. 2019312561, dated May 27, 2024 (3 pages).
Mexican Patent Office. Office Action for Application No. MX/a/2021/001286, dated May 7, 2024 (12 pages with machine translation).
European Patent Office Extended Search Report for Related Application No. 24165660.2 dated Aug. 21, 2024 (7 pages).
European Patent Office Extended European Search Report for Related Application No. 24172208.1 dated Oct. 17, 2024 (20 pages).

* cited by examiner

CONTAINER PREFORM WITH TAMPER EVIDENCE FINISH PORTION

PRIORITY

This application is a continuation of and claims priority to U.S. patent application Ser. No. 16/894,726, filed Jun. 5, 2020, which is a continuation-in-part application claiming the benefit of and priority to U.S. Provisional Application, entitled "Container Perform With Threaded Tamper Evidence Finish," filed Jul. 30, 2018 and having application Ser. No. 62/712,115, the entirety of said application being incorporated herein by reference.

FIELD

Embodiments of the present disclosure generally relate to the field of plastic bottles and preforms. More specifically, embodiments of the disclosure relate to a tamper evidence container preform that includes a stepped interior surface and is configured for being blow-molded to form a container to store liquid contents.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. Advantages of PET containers include lighter weight and decreased breakage as compared to glass, and lower costs overall when taking both production and transportation into account. PET resins are also reasonably priced and easy to process. PET containers are generally made by a process that includes the blow-molding of plastic preforms which have been made by injection molding of the PET resin.

A PET container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish portion. The finish portion is adapted to receive a closure, such as a bottle cap, to seal the contents within the interior of the plastic container.

In many instances, the closure includes a tamper evidence band that is disposed around the perimeter of the finish portion. The tamper evidence band generally remains positioned on the finish portion when an end-user loosens the closure to access the contents within the container. As such, the tamper evidence band and the finish portion cooperate to indicate to the end-user whether or not the closure has been previously loosened after being installed by the manufacturer.

Advantages of plastic containers include lighter weight and decreased breakage as compared to glass, and lower costs overall when taking both production and transportation into account. As such, there is a continuous interest in creating the lightest possible plastic container so as to maximize cost savings in both transportation and manufacturing by making and using containers that contain less plastic. Embodiments disclosed herein provide articles, including preforms and containers, that utilize less plastic in their construction while maintaining the ease of processing and excellent structural properties associated with current commercial designs.

BRIEF DESCRIPTION OF THE DRAWINGS

The drawings refer to embodiments of the present disclosure in which.

Figure 1:
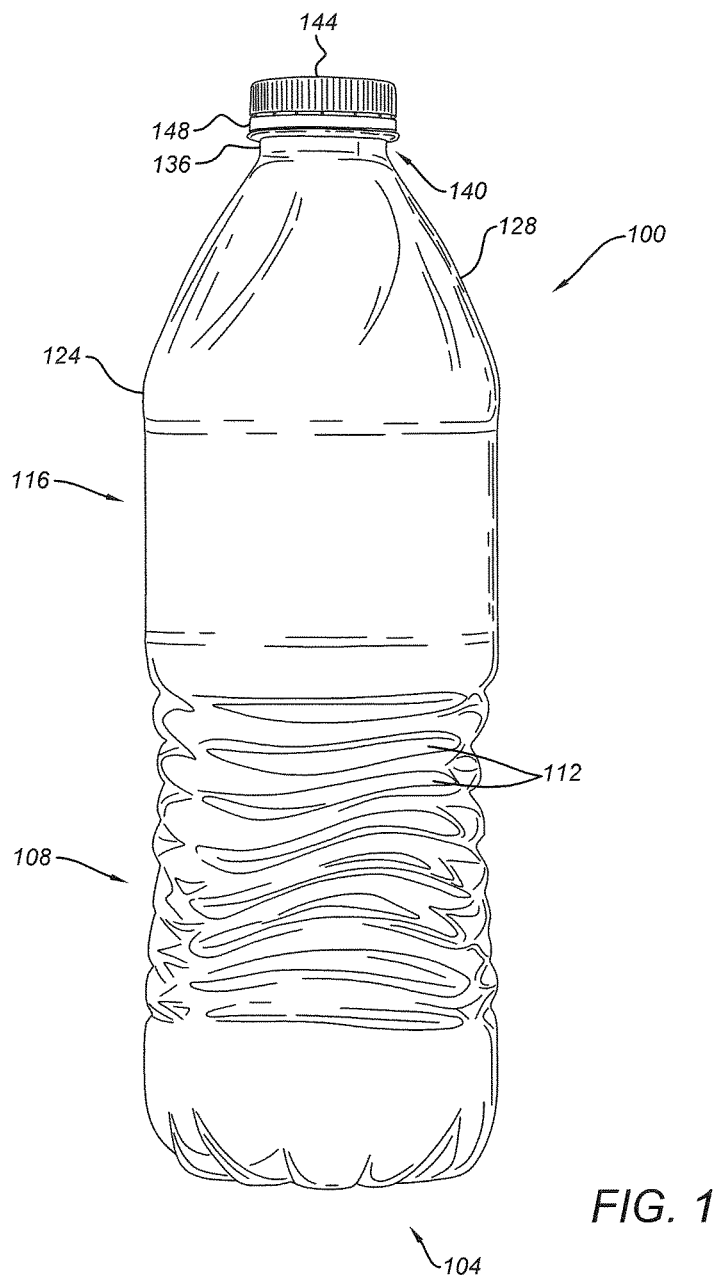
FIG. 1 illustrates a side view of an exemplary container suitable for storing liquid contents.

While the present disclosure is subject to various modifications and alternative foil is, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first container," may be made. However, the specific numeric reference should not be interpreted as a literal sequential order but rather interpreted that the "first container" is different than a "second container." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, there is a continuous interest in creating the lightest possible plastic container so as to maximize cost savings in both transportation and manufacturing, as well as reducing the amount of plastic waste in the environment, by making and using containers that contain less plastic. Embodiments disclosed herein provide a tamper evidence container preforms and containers that include stepped interior surfaces and utilize less plastic in their construction while maintaining an ease of processing and excellent structural properties associated with current commercial designs.

FIG. 1 illustrates a side view of an exemplary container 100 typically used for storing liquid contents, such as water, juice, and contents under pressure. The container 100 comprises a base 104 that extends up to a grip portion 108. In some embodiments, the base 104 may be of the petaloid variety, although other configurations of the base may be incorporated into the container 100, without limitation. The grip portion 108 comprises a plurality of grip portion ribs 112 (i.e., sidewall ribs). As illustrated in FIG. 1, the plurality of grip portion ribs 112 generally vary in depth, and swirl or angulate around the grip portion 108. A label portion 116 is connected to the grip portion 108 and comprises one or more label panel ribs (not shown). The label panel portion 116 transitions into a shoulder 124, which connects to a bell 128.

In the embodiment illustrated in FIG. 1, the bell 128 comprises a plurality of design features 132. In other embodiments, however, the bell 128 may include various other design features, or may be smooth and generally unornamented. The bell 128 connects to a neck 136, which connects to a finish portion 140. As shown in FIG. 1, the bell 128 comprises a diameter that generally decreases as the bell 128 extends upward from the shoulder 124 to the neck 136 and the finish portion 140. The finish portion 140 is adapted to receive a closure, such as by way of non-limiting example, a container cap or closure 144, so as to seal contents within the container 100. The finish portion 140 generally defines an opening that leads to an interior of the container 100 for containing a beverage, or other contents, such as any of a variety of carbonated soft drinks. The finish portion 140 may be of a Carbonated Soft Drink (CSD) variety or may be configured to receive closures suitable for sealing noncarbonated contents within the interior of the container 100. Further, in some embodiments, the finish portion 140 may be configured to retain hot-filled contents with the container or may be configured to retain a gas, such as nitrogen gas ($N_2$) within the interior of the container, without limitation.

As shown in FIG. 1, a tamper evidence closure 144, such as a bottle cap, may be threadably engaged with the finish portion 140. The closure 144 generally includes interior threads that are configured to engage with threads disposed on the finish portion 140, as described herein. During tightening of the closure 144 onto the finish portion 140, a plug seal of the closure 144 extends into the opening of the container 100 and enters into a pressed relationship with the finish portion 140 whereby contents may be sealed in the interior of the container 100.

With continuing reference to FIG. 1, the closure 144 includes a tamper evidence band 148 to provide an indication of whether or not the closure 144 has been loosened after being installed by a manufacturer. In some embodiments, the tamper evidence band 148 may be attached to the closure 144 by a multiplicity of thin connections. The tamper evidence band 148 may include a cam that is configured to fixedly engage with a tamper evidence ledge disposed on the finish portion 140 during loosening of the closure 144. Once the closure 144 is installed onto the finish portion 140 by a manufacturer and later an end-user loosens the closure 144, the cam engages the tamper evidence ledge, breaking the thin connections between tamper evidence band 148 and the closure 144. The tamper evidence band 148 remains positioned on the tamper evidence ledge after the closure 144 is removed from the container 100. As such, the tamper evidence band 148 cooperates with the tamper evidence ledge to indicate to the end-user whether or not the closure 144 has been previously loosened after being installed by the manufacturer.

Figure 2:
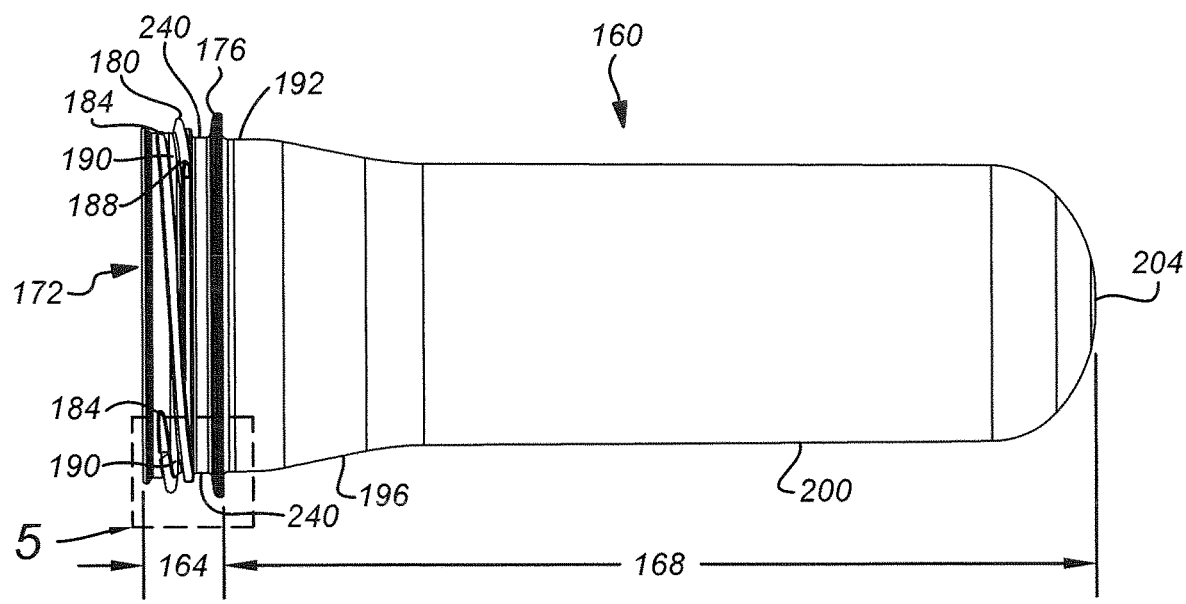
FIG. 2 a side plan view of an exemplary embodiment of a preform suitable for being blow-molded to form a container in accordance with the present disclosure.

FIG. 2 illustrates an exemplary embodiment of a preform 160 suitable for being blow-molded to form a plastic bottle, such as the container 100, according to the present disclosure. The preform 160 preferably is made of material approved for contact with food and beverages such as virgin PET or recycled PET and can be of any of a wide variety of shapes and sizes. The preform 160 shown in FIG. 2 is of the type which will form a 12-16 oz. beverage bottle, but as will be understood by those skilled in the art, other preform configurations may be used depending upon the desired configuration, characteristics and use of the final article. The preform 160 may be made by injection molding methods, without limitation.

The preform 160 includes a finish portion 164 and a body portion 168, formed monolithically (i.e., as a single, or unitary, structure). Advantageously, the monolithic arrangement of the preform 160, when blow-molded into a bottle, provides greater dimensional stability and improved physical properties in comparison to a preform constructed of separate neck and body portions that are bonded together.

The finish portion 164 begins at an opening 172 to an interior of the preform 160 and extends to and includes a tamper evidence ledge 176. The finish portion 164 is further characterized by the presence of one or more threads 180 configured to provide a means to fasten a cap, such as the closure 144 of FIG. 1, to the bottle produced from the preform 160. As such, the threads 180 are configured to rotatably engage with similar threads disposed within the closure 144 to provide a way to seal contents within the bottle. In the embodiment illustrated in FIG. 2, each of the threads 180 generally extends along a section of the circumference of the finish portion 164 and approaches the tamper evidence ledge 176. Thus, when the threads of the closure 144 are engaged with the threads 180, and the closure 144 is rotated in a clockwise direction, the closure 144 advances toward the tamper evidence ledge 176.

With continuing reference to FIG. 2, each of the one or more threads 180 begins at a thread start 184 and extends along an angular section of the finish portion 164 to a thread end 188. The thread start 184 is configured to guide a thread comprising the closure 144 into a space, or a valley 190, between adjacent threads 180 so as to threadably engage the closure 144 with the finish portion 164. Further, the threads 180 generally are disposed adjacently to one another, separated by valleys 190, and are spaced uniformly around the circumference of the finish portion 164. In some embodiments, wherein three threads 180 are disposed around the finish portion 164, the thread starts 184 of adjacent threads 180 are spaced at substantially 120-degree intervals around the perimeter of the finish portion 164. As will be appreciated, however, more or less than three threads 180 may be incorporated into the finish portion 164 without deviating beyond the scope of the present disclosure.

In some embodiments, a plurality of gaps (not shown) may be disposed in the threads 180 and positioned uniformly around the perimeter of the finish portion 164. Preferably, the gaps of adjacent threads 180 are vertically aligned so as to form channels extending longitudinally along the finish portion 164. The channels advantageously operate to relieve pressure within the container 100 when the closure 144 is loosened. As will be appreciated, the channels may provide a direct route for gases escaping the interior of the container 100, rather than the gases being forced to travel around the finish portion 164 between adjacent threads 180.

The body portion 168 includes a neck portion 192 that extends to a tapered portion 196 of the body portion 168. The tapered portion 196 comprises a smooth transition from a diameter of the neck portion 192 to a relatively smaller diameter of a cylindrical portion 200 of the preform 160. The cylindrical portion 200 is a generally elongate member that culminates in an end cap 204. In some embodiments the body portion 168 may be generally cylindrical, and the end cap 204 may be conical or frustoconical and may also be hemispherical, and the very terminus of the end cap 204 may be flattened or rounded.

In some embodiments, a wall thickness of the cylindrical portion 200 may be substantially uniform throughout the cylindrical portion 200 and the end cap 204. A wall thickness of the tapered portion 196, however, generally decreases from the wall thickness of the cylindrical portion 200 to a relatively thinner wall thickness of the neck portion 192. As will be appreciated, the wall thickness of the cylindrical portion 200 is relatively greater than the wall thickness of the neck portion 192 so as to provide a wall thickness at the desired dimensions of a finished product after the preform 160 is blow-molded into the shape and size of a bottle. As such, the wall thickness throughout most of the body portion 168 will depend upon the overall size of the preform 160 and the wall thickness and overall size of the resulting container.

Figure 3:
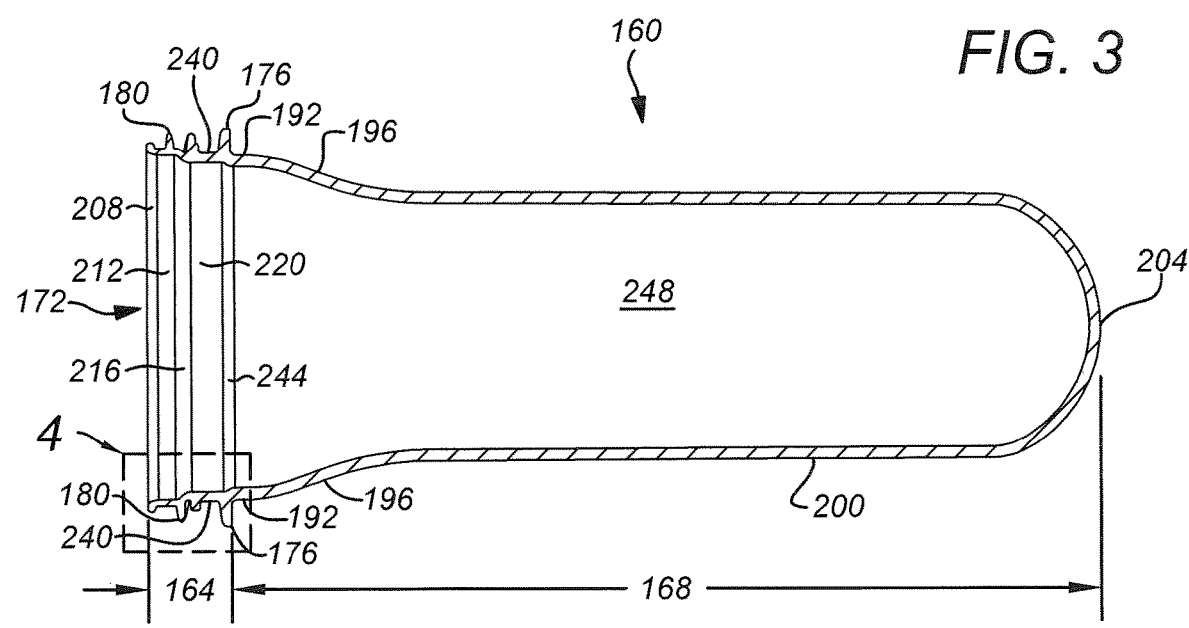
FIG. 3 illustrates a cross-sectional view of the preform of FIG. 2, taken a long midline of the preform.

FIG. 3 illustrates a cross-sectional view of the preform 160 illustrated in FIG. 2, taken along a midline of the preform 160. As will be appreciated, the finish portion 164 comprises a cylindrical body that begins at the opening 172 to the interior of the container 100 and extends to and includes the tamper evidence ledge 176. The finish portion 164 includes a bevel 208 disposed at the beginning of the opening 172. The bevel 208 is configured to enter into sliding contact with a plug seal of the closure 144 so as to prevent contents from leaking out of the container 100 formed from the preform 160. In some embodiments, the bevel 208 operates to guide the plug seal onto a sealing surface 212 disposed on an interior of the finish portion 164. In general, the bevel 208 and the sealing surface 212 comprise portions of the interior of the finish portion 164 that extend circumferentially around the opening 172.

As will be appreciated, the sealing surface 212 must comprise a sufficiently smooth surface capable of cooperating with the plug seal to retain contents under pressure, such as carbonated contents, within the container 100. To this end, it is contemplated that the sealing surface 212 may be highly polished so as to be substantially free of surface defects and thus conditioned to form a tight seal with the plug seal of the closure 144. Preferably, the sealing surface 212 is to be polished to a degree of smoothness that is commonly associated with a mirror finish. As such, it is contemplated that the sealing surface 212 comprises a mirror polished region along the interior of the finish portion 164. Further, in some embodiments, the bevel 208 may also be conditioned to comprise a mirror polished region at the beginning of the opening 172. Any of various techniques may be used to mirror polish either or both of the sealing surface 212 and the bevel 208, without limitation.

Figure 4:
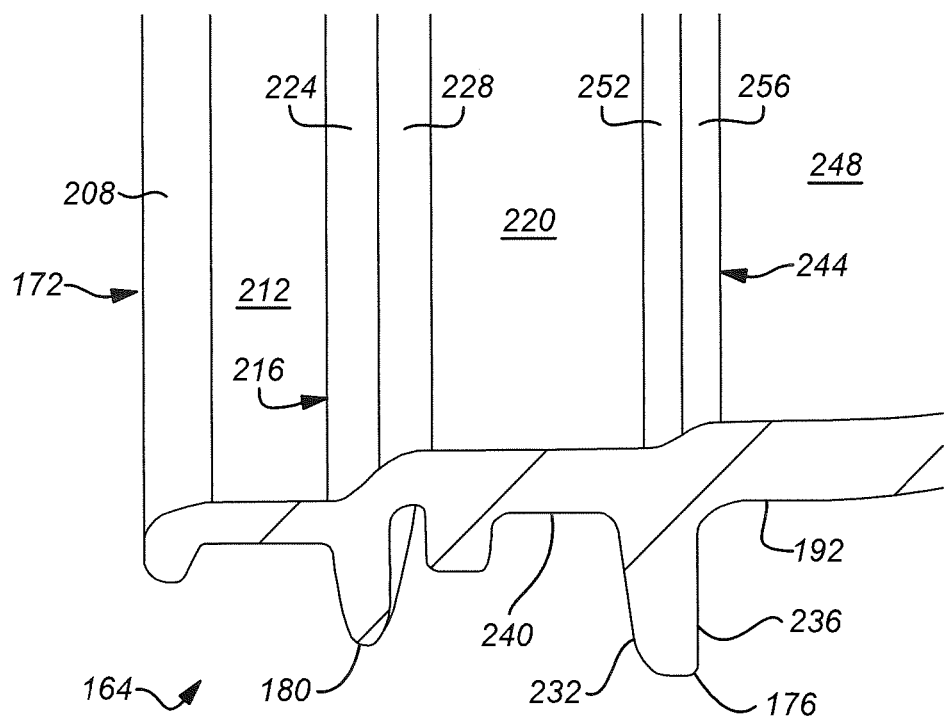
FIG. 4 illustrates a close-up cross-sectional view of a sidewall portion of a finish portion comprising the preform illustrated in FIG. 2.

As shown in FIG. 3, the sealing surface 212 extends away from the bevel 208, deeper into the opening 172 to a transition surface 216. The transition surface 216 comprises a region within the interior of the finish portion 164 wherein the interior diameter of the opening 172 generally narrows from the diameter of the sealing surface 212 to a smaller diameter of a handing surface 220. As best shown in FIG. 4, the transition surface 216 comprises a reverse curve surface that includes a concave portion 224 that extends from the sealing surface 212 and joins with a convex portion 228 that extends to the handling surface 220. As will be recognized, the handling surface 220 includes a diameter of the opening 172 that is configured to receive various forms of equipment used to configure the preform 160 into the container 100.

It is contemplated that the transition surface 216 is to be capable of cooperating with the plug seal of the closure 144 to form a tight seal between the closure 144 and the container 100. In some embodiments, the concave portion 224 may be configured to forcibly receive an end of the plug seal so as to form a tight seal therebetween. Further, in some embodiments, the convex portion 228 may be configured to forcibly receive the end of the plug seal. As such, the transition surface 216 may include a smooth surface that is polished similarly to the sealing surface 212. It is envisioned that the transition surface 216 may be mirror polished, as described hereinabove with respect to the sealing surface 212.

Moreover, in some embodiments, the plug seal of the closure 144 may be configured to extend into the opening 172 such that the plug seal cooperates with the handling surface 220 to seal the container 100. In such embodiments, the plug seal may include a sidewall shape that mates with the concave and convex portions 224, 228. As will be appreciated, therefore, the handling surface 220 may be mirror polished similarly to the sealing surface 212 and the transition surface 216. It is contemplated that mirror polished surface may be achieved by way of any of various suitable polishing techniques, such as mechanical machining and buffing, chemical treatments, plasma treatments, and the like, without limitation.

In some embodiments, such as the illustrated embodiment of FIGS. 3-4, a secondary transition surface 244 may be disposed between the handling surface 220 and an interior surface 248 of the body portion 168. In general, the secondary transition surface 244 comprises a region within the interior of the finish portion 164 wherein the interior diameter of the opening 172 narrows from the diameter of the handling surface 220 to a smaller diameter of the interior surface 248. As shown in FIG. 4, the secondary transition surface 244 comprises a reverse curve surface that includes a concave portion 252 that extends from the handling surface 220 to a convex portion 256 that extends to the interior surface 248.

In some embodiments, the secondary transition surface 244 may be configured to cooperate with the plug seal of the closure 144 to form a tight seal between the closure 144 and the container 100 suitable for storing pressurized contents, such as carbonated beverages, within the container 100. As such, the concave portion 252 may be configured to tightly receive an end of the plug seal to form a tight seal therebetween. In some embodiments, the convex portion 256 may be configured to forcibly receive and compress the end of the plug seal. To this end, the secondary transition surface 244 may include a smooth surface that is polished similarly to the sealing surface 212. It is envisioned that the secondary transition surface 244 may be mirror polished, as described hereinabove with respect to the sealing surface 212.

In some embodiments, the plug seal of the closure 144 may be configured to extend into the opening 172 such that the plug seal extends beyond the secondary transition surface 244 and thus cooperates with the portion of the interior surface 248 near the convex portion 256. In some embodiments, the interior surface 248 may have a diameter that tightly compresses the end of the plug seal to seal the pressurized contents within the container 100. It is contemplated that, in some embodiments, the plug seal may include a sidewall profile that mates with the concave and convex portions 252, 256. As such, the interior surface 248 preferably is mirror polished similarly to the mirror polish of the sealing surface 212. As disclosed hereinabove, the mirror polished surface may be achieved by way of any of various suitable polishing techniques, such as mechanical machining and buffing, chemical treatments, plasma treatments, and the like, without limitation.

In the embodiment illustrated in FIG. 3, the surfaces 212, 220, 248 generally comprise a stepped interior of the finish portion 164. As such, the stepped interior comprises a graduated narrowing of the opening 172 that extends from the bevel 208, through the finish portion 164, to the tamper evidence ledge 176. It is contemplated that the stepped interior comprises multiple sidewall portions of the finish portion 164 that may be configured to advantageously minimize the quantity of resin comprising the finish portion 164, as compared to finish portions comprising a substantially uniform diameter.

In some embodiments, the stepped interior may be configured to compressibly receive a plug seal of the closure 144 that comprises graduated seals configured to tightly engage with the graduated narrowing of the opening 172. For example, the stepped interior can include one or more sealing surfaces that are each configured to tightly engage with one of the graduated seals of the plug seal to contribute to forming a tight seal between the closure 144 and the container 100. As will be appreciated, therefore, the graduated seals of the plug seal generally include diameters that are suitable for engaging with the graduated narrowing of the opening 172 so as to seal pressurized contents, such as carbonated beverages, within the container 100. It is contemplated that the one or more sealing surfaces comprise mirror-polished surfaces that are joined together by transition surfaces. Further, the transition surfaces 216, 244 are contemplated to comprise mirror-polished surfaces that cooperate with the one or more seals of the plug seal so as to contribute to forming the tight seal between the closure 144 and the container 100. It is contemplated that such a seal may also be formed by configuring an interference fit between the plug seal and the finish portion 164 such that the interference accommodates a range of environments in which the seal must perform. Those environments can include a range of internal pressures, a range of temperatures that can impact either or both pressure and dimensions of the closure 144 and container 100, or a range of tolerances arising due to injection molding and assembling the closure 144 and container 100.

In the exemplary embodiment shown in FIG. 3, the sealing surface 212 is configured to compressibly receive a first seal comprising the plug seal, and the handing surface 220 is configured to compressibly receive a second seal of the plug seal. Further, the interior surface 248 may be configured to compressibly receive a third seal comprising the plug seal. According, the sealing surface 212 includes a first diameter configured to tightly compress the first seal of the plug seal, and the handling surface 220 includes a second diameter configured to tightly compress the second seal. The interior surface 248 includes a third diameter configured to tightly compress the third seal of the plug seal. As will be appreciated, the third diameter is equal to or less than the second diameter, and the second diameter is equal to or less than the first diameter. Further, the transition surface 216 comprises a change in diameter of the opening 172 that transitions from the first diameter of the sealing surface 212 to the second diameter of the handling surface 220. The secondary transition surface 244 comprises a change diameter of the opening 172 that transitions from second diameter of the handling surface 220 to the third diameter of the interior surface 248. As disclosed hereinabove, the transition surfaces 216, 244 comprise mirror-polished surfaces that may be faulted by way of any of various suitable polishing techniques.

Turning again to FIG. 4, the tamper evidence ledge 176 comprises a rounded upper portion 232 and a substantially flat lower portion 236. In some embodiments, however, the upper portion 232 may be substantially flat, in lieu of being rounded as shown in FIG. 4. As will be appreciated, the rounded upper portion 232 facilitates passing the tamper evidence band 148 of the closure 144 over the tamper evidence ledge 176 during assembly of the closure 144 onto the container 100. In some embodiments, the tamper evidence band 148 may include one or more rounded portions configured to facilitate passing over the tamper evidence ledge 176 during assembly of the closure 144 onto the container 100.

The flat lower portion 236 may be configured to retain the tamper evidence band 148 positioned below the tamper evidence ledge 176 during loosening of the closure 144. For example, when the closure 144 is initially installed onto the container 100 by a manufacturer, the tamper evidence band 148 easily passes over the tamper evidence ledge 176 due to the rounded upper portion 232. When an end-user later loosens the closure 144, the flat lower portion 236 retains the tamper evidence band 148 below the tamper evidence ledge 176, causing the tamper evidence band 148 to break loose from the closure 144. Thus, the flat lower portion 236 of the tamper evidence ledge 176 and the tamper evidence band 148 of the closure 144 cooperate to indicate to the end-user that the closure 144 has not been previously loosened after being installed by the manufacturer. It should be understood, however, that the tamper evidence ledge 176 is not limited to being coupled with tamper evidence bands, as described above, but rather the tamper evidence ledge 176 may be configured to operate with any of various devices for indicating whether or not the container has been previously opened. For example, it is contemplated that including a flat upper portion, as mentioned above, facilitates incorporating a tamper evidence band that remains coupled with the tamper evidence ledge 176, thereby preventing the tamper evidence band from falling down the neck portion 192 onto the top of the bell 128 of the container 100.

Disposed between the tamper evidence ledge 176 and the threads 180 is a handling valley 240 that extends circumferentially around the finish portion 164. The handling valley 240 comprises a portion of the finish portion 164 that has a wall thickness and a diameter that are substantially similar to the wall thickness and diameter of the neck portion 192, below the tamper evidence ledge 176. As such, the handling valley 240 and the neck portion 192 advantageously enable gripping fingers to engage with and support the container 100 when conveying the container 100 along a manufacturing assembly line. For example, a first pair of gripping fingers can extend into the handling valley 240 to support the container 100 at a first station of a manufacturing line. Then, upon being conveyed to a second station, a second pair of gripping fingers can extend around the neck portion 192, below the tamper evidence ledge 176, while the first pair of gripping fingers are removed from the handling valley 240. Similarly, upon arriving at a third station, a third pair of gripping fingers can engage with the handling valley 240 while the second pair of gripping fingers are removed from the neck portion 192. Thus, the container 100 can be transported along the manufacturing line by alternatingly engaging gripping fingers with the handling valley 240 and the neck portion 192. As will be appreciated, the flat lower portion 236 comprises a surface area that is substantial enough for air-conveying the container 100 along the manufacturing line, although many modern manufacturing lines no longer require surfaces for air-conveyance.

As will be appreciated, the handling valley 240 provides a separation between the tamper evidence ledge 176 and the threads 180 suitable for receiving the pair of gripping fingers, as described above. In general, the separation must be large enough to allow the gripping fingers to easily pass between the tamper evidence ledge 176 and the threads 180. As such, any of various separations, greater than the width of the gripping fingers, may be disposed between the tamper evidence ledge 176 and the threads 180, without limitation and without deviating beyond the scope of the present disclosure.

Once the preform 160 has been blow-molded to form the container 100 and then the container 100 has been filled with liquid contents, the closure 144 is installed onto the finish portion 164, by way of suitable equipment, to seal the contents in the interior of the container 100. In general, the threads 180 disposed around the finish portion 164 are engaged with similar threads comprising the closure 144 and then the closure 144 is rotated in a clockwise direction to advance the closure 144 toward the tamper evidence ledge 176. The closure 144 preferably is tightened until the tamper evidence band 148 is pushed over the tamper evidence ledge 176 and a plug seal comprising the closure 144 extends into the opening 172 of the finish portion 164, thereby sealing the liquid contents within the container 100.

In an assembly-line environment, a multiplicity of containers 100 are filled with liquid contents and sealed by closures 144 as the containers 100 are conveyed along the assembly-line. Each closure 144 must be optimally threaded and tightened onto the finish portion 164 of the container 100. If the closure 144 is under-tightened, the container 100 may be left unsealed and the liquid contents may leak out of the container 100. Alternatively, if the closure 144 is over-tightened, the closure 144 and the finish portion 164 may be damaged, again allowing the liquid contents to leak out of the containers 100. Moreover, if the threads of the closure 144 are improperly engaged with the threads 180, cross-threading and/or damaging of the threads 180 and the threads of the closure 144 may result, leading again to unsealed containers that may leak. In general, closures 144 must be optimally threaded and tightened onto finish portions 164 of the containers 100 by way of suitable installation equipment.

Figure 5:
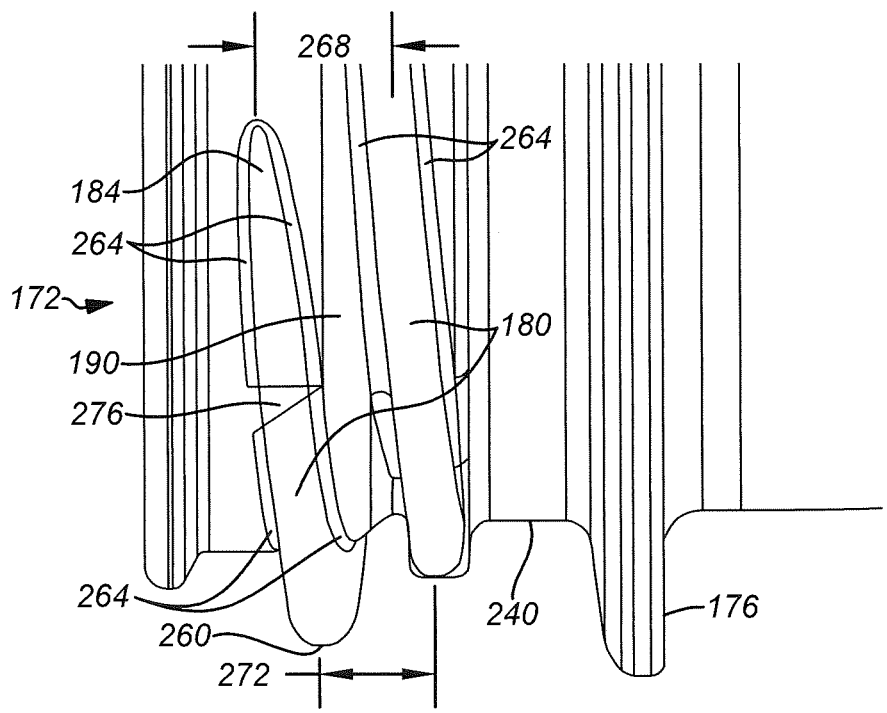
FIG. 5 illustrates a close-up plan view of a thread start disposed on the container preform of FIG. 2, showing that a thread start that is oriented towards a top of a finish portion comprising the container preform.

The embodiment of the preform 160 illustrated in FIG. 2 includes thread starts 184 that are configured to guide the threads of the closure 144 into the valleys 190 between the threads 180 of the finish portion 164. As best shown in FIG. 5, each of the threads 180 generally includes a rounded crest 260 joined with the sidewall of the finish portion 164 by way of concave flanks 264. The flanks 264 include a relatively uniform width along a majority of the length of the threads 180. Along the thread start 184, however, the width of the flank 264 nearest the opening 172 may be narrower that the width of the flank 264 facing away from the opening 172. As such, the thread start 184 may be oriented, or biased, toward the opening 172 of the preform 160, such that a start pitch 268 disposed between the thread start 184 and the nearest neighboring thread 180 generally is greater than a thread pitch 272 disposed between adjacent threads 180. Further, a gap 276 may separate the thread start 184 from the rest of the thread 180, thereby separating the start pitch 268 of the thread start 184 from the thread pitch 272 of the thread 180. As will be appreciated, the start pitch 268 is configured to advantageously guide a thread of the closure 144 into the valley 190 with a reduced potential of damaging or cross-threading the threads 180.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A finish portion of a container preform for forming a plastic container, the finish portion comprising:
   an opening to an interior of the container preform; and
   an internal portion narrowing from the opening, the internal portion including
      a first transition surface extending from a sealing surface to a handling surface having a diameter smaller than a diameter of the sealing surface, wherein the first transition surface includes a concave portion that extends from the sealing surface and joins with a convex portion that extends to the handling surface, and
      a second transition surface extending from the handling surface to an interior surface having a diameter smaller than the diameter of the handling surface, wherein the second transition surface includes a concave portion that extends from the handling surface and joins with a convex portion that extends to the interior surface.

2. The finish portion of claim 1, wherein the internal portion narrowing from the opening is a stepped portion.

3. The finish portion of claim 1, wherein the sealing surface is configured to cooperate with a plug seal of a closure.

4. The finish portion of claim 1, including one or more threads disposed on an exterior of the finish portion for rotatably engaging a closure.

5. The finish portion of claim 1, wherein the sealing surface and the handling surface are polished surfaces.

6. The finish portion of claim 5, wherein the interior surface is a polished surface.

7. A finish portion of a container preform for forming a plastic container, the finish portion comprising:
   an opening to an interior of the container preform; and
   an internal portion narrowing from the opening, the internal portion including
      a first transition surface extending from a sealing surface to a handling surface having a diameter smaller than a diameter of the sealing surface, wherein the first transition surface includes a concave portion that extends from the sealing surface, and
      a second transition surface extending from the handling surface to an interior surface having a diameter smaller than the diameter of the handling surface, wherein the second transition surface includes a concave portion that extends from the handling surface.

8. The finish portion of claim 7, wherein the transition surface is configured to cooperate with a plug seal of a closure.

9. The finish portion of claim 7, wherein the sealing surface is configured to cooperate with a plug seal of a closure.

10. The finish portion of claim 7, wherein the handling surface is configured to cooperate with a plug seal of a closure.

11. The finish portion of claim 7, wherein the internal portion narrowing from the opening is a stepped portion.

12. A finish portion of a container preform for forming a plastic container, the finish portion comprising:
an opening to an interior of the container preform; and
an internal portion narrowing from the opening, the internal portion including
a first transition surface extending from a sealing surface to a handling surface having a diameter smaller than a diameter of the sealing surface, wherein the first transition surface includes a convex portion that extends to the handling surface, and
a second transition surface extending from the handling surface to an interior surface having a diameter smaller than the diameter of the handling surface, wherein the second transition surface includes a convex portion that extends to the interior surface.

13. The finish portion of claim 12, wherein the transition surface is configured to cooperate with a plug seal of a closure.

14. The finish portion of claim 12, wherein the sealing surface is configured to cooperate with a plug seal of a closure.

15. The finish portion of claim 12, wherein the handling surface is configured to cooperate with a plug seal of a closure.

16. The finish portion of claim 12, wherein the internal portion narrowing from the opening is a stepped portion.

17. A container assembly comprising a closure with a plug seal and a container having a finish portion identical to the finish portion of claim 1.

* * * * *